Feb. 10, 1942.　　T. P. FLYNN ET AL　　2,272,619
TRACTOR AND RUDDER HITCH
Filed March 26, 1940　　3 Sheets-Sheet 1
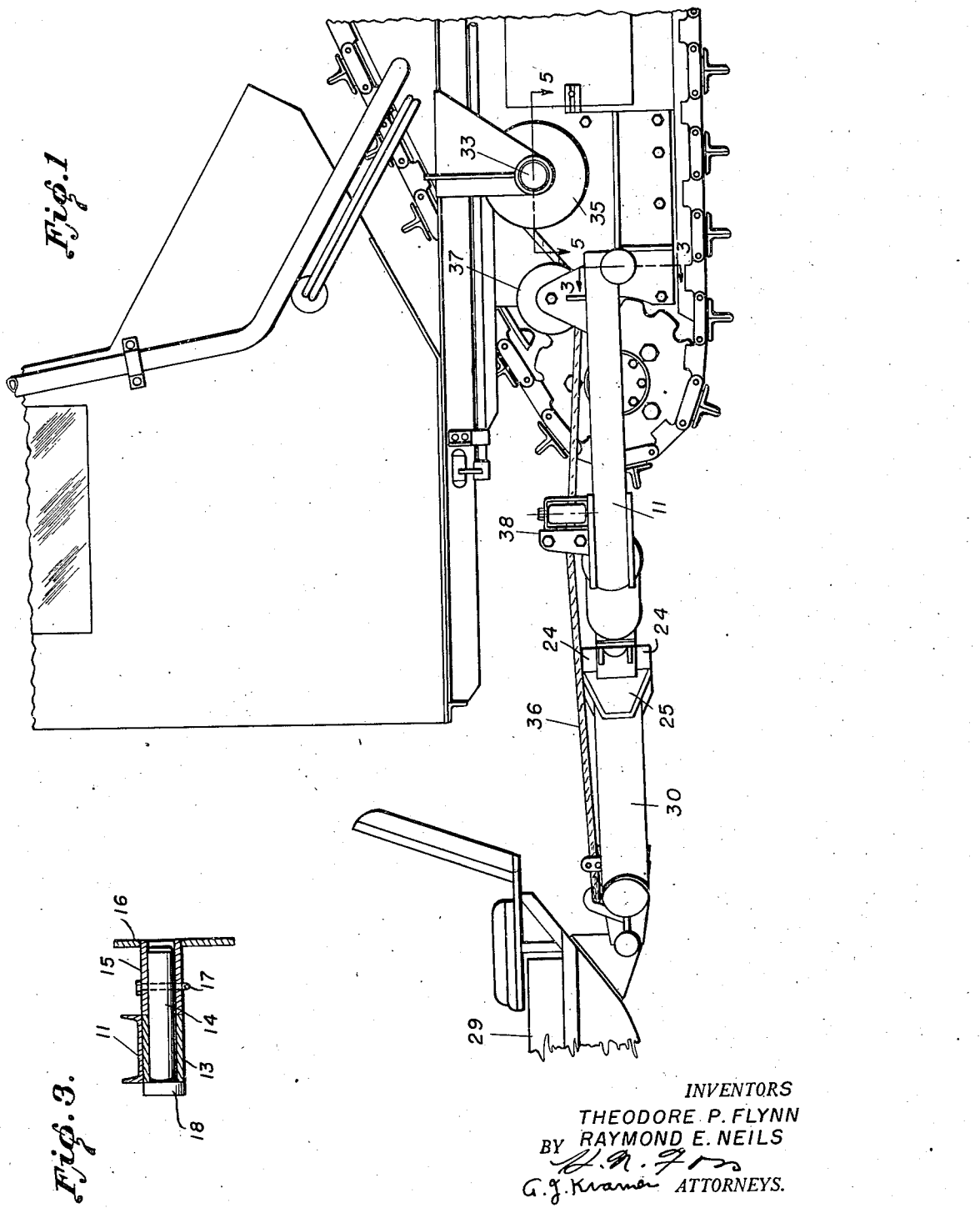
INVENTORS
THEODORE P. FLYNN
BY RAYMOND E. NEILS
ATTORNEYS.

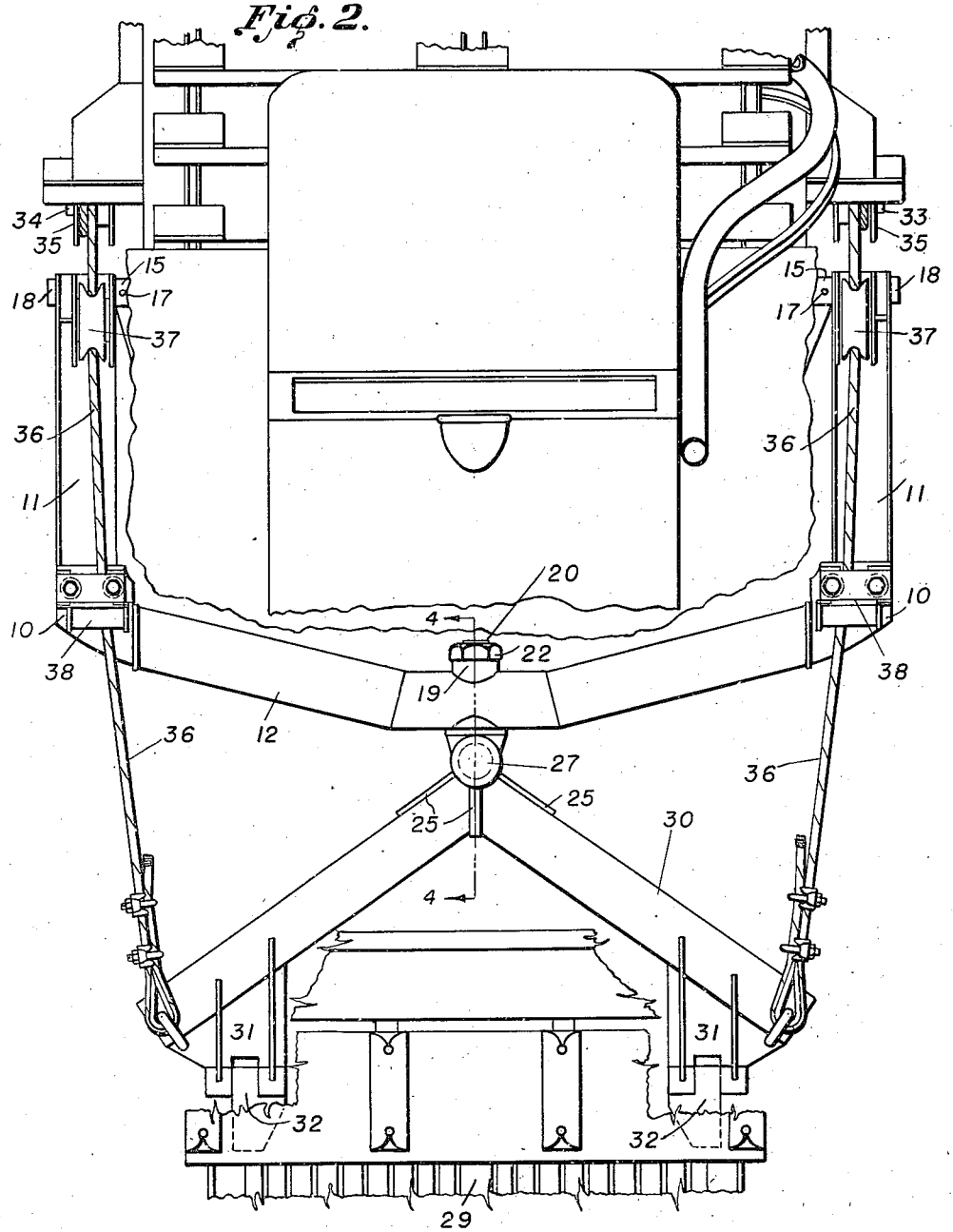

Feb. 10, 1942. T. P. FLYNN ET AL 2,272,619
TRACTOR AND RUDDER HITCH
Filed March 26, 1940 3 Sheets-Sheet 3
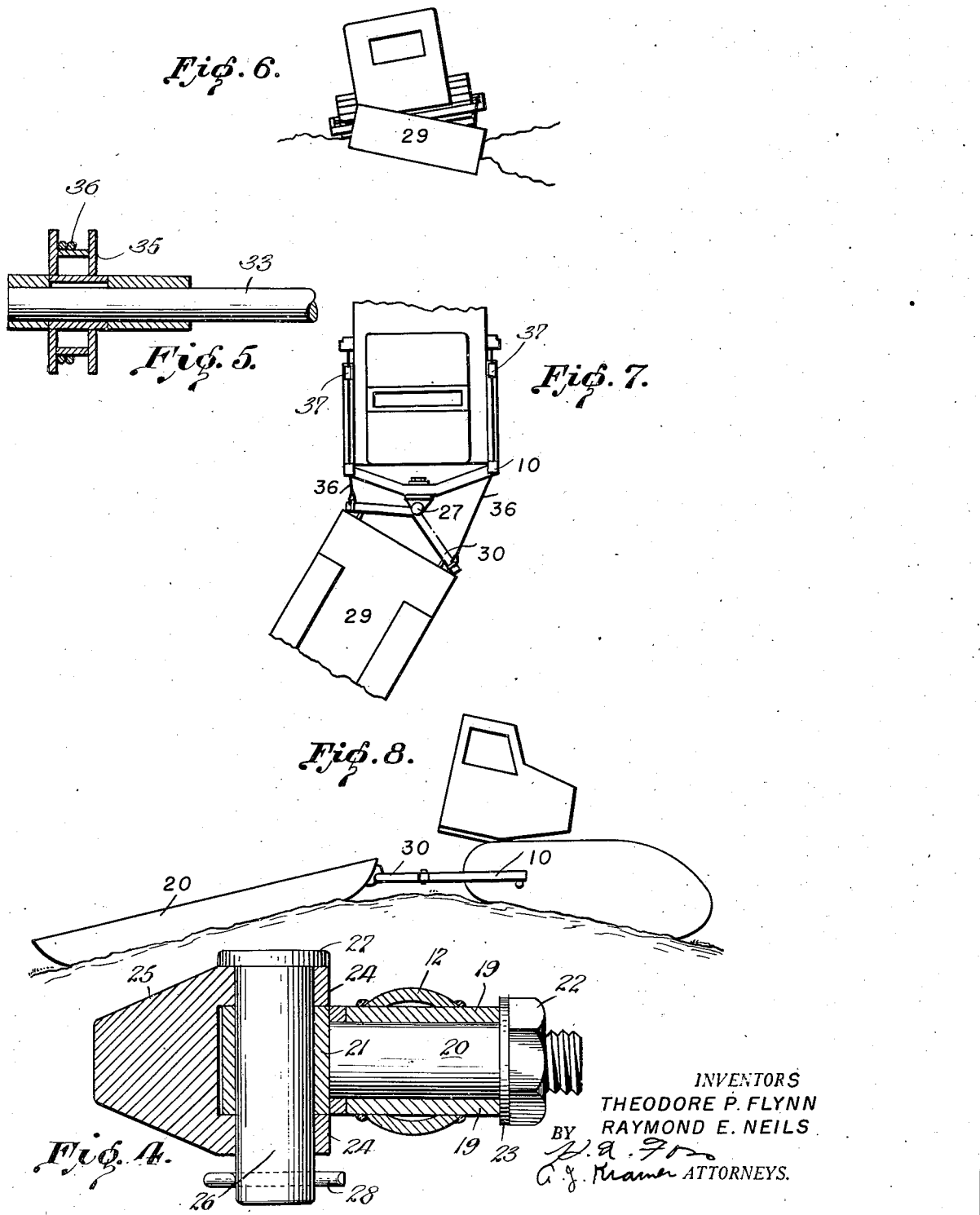
INVENTORS
THEODORE P. FLYNN
RAYMOND E. NEILS
BY
ATTORNEYS.

Patented Feb. 10, 1942

2,272,619

UNITED STATES PATENT OFFICE 2,272,619

TRACTOR AND RUDDER HITCH

Theodore P. Flynn and Raymond E. Neils, Portland, Oreg., dedicated to the free use of the People in the territory of the United States Application March 26, 1940, Serial No. 325,990

5 Claims. (Cl. 180—5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to use of any royalty thereon.

We hereby dedicate the invention herein described to the free use of the People in the territory of the United States to take effect on the granting of a patent to us.

This invention relates to snow tractors, is more particularly concerned with means for guiding the tractor, and is an improvement over our co-pending application for patent, Serial No. 170,400, filed October 22, 1937.

In our co-pending application, above-referred to, there is described means for steering a snow tractor by employing a trailing sled controlled by the operator of the tractor through power-operated means. In addition to utilizing the sled as a steering means, it is also capable of being used for carrying passengers and cargo.

Our present invention is concerned with a new means for connecting the sled to the tractor in order to obviate certain undesirable characteristics heretofore encountered in this general method of steering snow tractors. The present invention permits entirely free movement of the tractor independent of the drawbar connecting the sled to the tractor and eliminates any pull-down at the rear of the tractor. This permits the front end of the tractor to stay down in full contact with the snow, thereby increasing the tractive ability of the tractor.

The following description, considered together with the accompanying drawings, will disclose this invention more fully, its constructions, arrangements, combinations, and operations of parts and further objects and advantages thereof will be apparent.

In the drawings:

Figure 1 is a side elevational view of an embodiment of this invention, the tractor and steering sled being illustrated fragmentarily.

Figure 2 is a plane view of Figure 1.

Figure 3 is a partial section along the line 3—3 of Figure 1.

Figure 4 is a section along the line 4—4 of Figure 1.

Figure 5 is a partial section along the line 5—5 of Figure 2.

Figures 6, 7 and 8 illustrate diagrammatically the advantages of the invention, Figure 6 being a rear view of the sled and tractor when the two are disposed on different inclines; Figure 7 being a fragmentary plane view illustrating the relation of the tractor and sled when a turn is being negotiated; and Figure 8 being a side elevational view showing the relative positions of tractor and sled when operating on a surface of uneven profile.

Referring with more particularity to the drawings in which like numerals designate like parts, the embodiment illustrated comprises a yoke member indicated generally at 10, said yoke member comprising a pair of longitudinal arms 11 straddling the rear end of the tractor, the rearward ends of said arms being secured to a transverse structural member 12. The forward ends of the arms 11 are secured to sleeves 13 said sleeves being rotatably mounted on stub shafts 14 projecting laterally from the frame of the tractor by any suitable means. The means illustrated comprise a socket 15 secured to a frame support 16 within which stub shaft 14 is disposed and secured by means of a radial pin 17, substantially as shown in Figure 3. The outer end of each shaft 14 is flanged to provide a head 18 so that the sleeve 13 is held in position laterally between said head and the socket 15 with sufficient play to permit it to rotate about the shaft 14 freely.

As illustrated in Figures 2 and 4, the middle of the transverse member 12 there is secured a horizontal sleeve bearing 19 within which a stub shaft 20 is rotatably mounted. The rearward end of the shaft 20 is secured to a vertical sleeve bearing 21. The forward end of the shaft 20 is threaded with which a nut 22 and washer 23 is associated to hold said shaft in position longitudinally. A pair of collar bearings 24 straddle the bearing 21 vertically. The bearings 24 are connected by means of brackets 25. A vertical pin 26 is disposed through the bearings 21 and 24, substantially as shown, whereby the bearings 24 are rotatably mounted with respect to the bearings 21. The upper end of the pin 26 is flanged to provide a head 27, and the lower end is fitted with a cotter pin 28 to hold it in position. The connection between the shaft 20 and the brackets 25 comprises, in effect, a vertical knuckle joint.

To the forward end of the steering sled 29 there is secured a V-yoke 30 forwardly converging. The forward end of said yoke is integral with the brackets 25. The yoke member 30 is secured to the sled in a hingable manner by means of lugs 31 fixed to the outer ends of the yoke 30 said lugs being each pivoted to brackets 32 said brackets being fixed to the sled, substantially as shown.

The tractor is provided with powered shafts 33 and 34 disposed transversely on opposite sides of the tractor and slightly forward of the yoke 10. Adjacent the outer end of each of the shafts 33 and 34 there is fixed a drum wheel 35 adapted for spooling a cable 36. On the forward ends of the arms 11 there is mounted cable sheaves 37 as close as possible to the pivot point. At the rearward ends of said arms 11 there is also disposed fairleads 38 for said cables. The cables 36 are threaded under the sheaves 37 through the fairleads 38 and anchored to yoke member 30, one on each end thereof, substantially as shown.

The above arrangement provides three degrees of freedom between the tractor and the steering sled, one permitting the steering sled to move vertically with respect to the tractor, the second permitting the sled to revolve in a horizontal plane with respect to the tractor, and the third permitting the sled to rotate about a longitudinal center. The second degree of freedom, which permits the sled to revolve in the horizontal plane is the only one which is controlled by the operator, and this is accomplished through the medium of cables 36. Each cable is controlled independently by its corresponding cable drum wheel 35. The means for rotating said shafts 33 and 34 may be by any suitable arrangement from a take-off of the power plant of the tractor or independent prime mover. Such means are not here illustrated, but are fully shown in my above-mentioned co-pending application for patent, said means comprising a transmission arrangement whereby power may be delivered to either of the shafts for winding up cable, and when power is applied to one of said shafts the other shaft is free to permit its corresponding cable drum to pay out cable. However, any other suitable means for accomplishing this general purpose may be employed.

From the above it will be seen that we have provided free and unrestricted movement between the yoke members 10 and 30 with the elimination of opposing forces in any direction. This reduces the horsepower required for steering to a minimum and provides uniform traction for the tractor in any position relative to the sled.

Although in the above-described particular reference was made to a snow tractor and trailing sled, it is to be understood that this invention is also applicable to other conventional types of tractors and trailers.

Having thus described our invention, we claim:

1. In a snow tractor having a trailing sled for steering the tractor, means for coupling said tractor and sled, said means comprising a yoke member horizontally hinged to said tractor, another yoke member horizontally hinged for free and unlimited pivotal movement to said sled, a horizontal stub shaft rotatably engaged with one of said yokes and vertically hinged to the other yoke.

2. The combination with a snow tractor having a sled for steering the tractor, means for coupling said tractor and sled, said means comprising a pair of yoke members horizontally hinged for free and unlimited pivotal movement to the tractor and sled, respectively, a horizontal stub shaft rotatably engaged with one of said yoke members and vertically hinged to the other yoke member.

3. In a snow tractor, a steering device comprising a sled rudder, a pair of yoke draw bars horizontally hinged for free and unlimited pivotal movement to said tractor and rudder, respectively, a horizontal shaft rotatably engaged with one of said draw bars and vertically hinged to the other draw bar, and means for controlling the horizontal relation between said rudder and tractor.

4. In a snow tractor, a steering device comprising a sled rudder, a pair of yoke draw bars horizontally hinged for free and unlimited pivotal movement to said tractor and rudder, respectively, a horizontal shaft rotatably engaged with one of said draw bars and vertically hinged to the other draw bar, a pair of cables having one end of each fixed to opposite sides of the draw bar associated with the rudder, and drums for independently spooling each of said cables, said drums being mounted on said tractor.

5. In a snow tractor, a steering device comprising a sled rudder, a pair of yoke draw bars horizontally hinged to said tractor and rudder, respectively, a horizontal shaft rotatably engaged with one of said yokes and vertically hinged to the other yoke, a pair of cables having one end of each fixed to opposite sides of the rudder yoke, drums for independently spooling each of said cables, said drums being mounted on said tractor, a vertical sheave mounted on each side of the tractor yoke to engage its corresponding cable vertically over the hinged point of the tractor yoke, fairleads secured to the tractor yoke rearward of said sheaves, said cables being disposed through said fairleads.

THEODORE P. FLYNN.
RAYMOND E. NEILS.